June 23, 1936.  E. A. LARSSON  2,044,886
TROLLEY HEAD AND CURRENT COLLECTOR
Filed Feb. 9, 1934   2 Sheets-Sheet 1
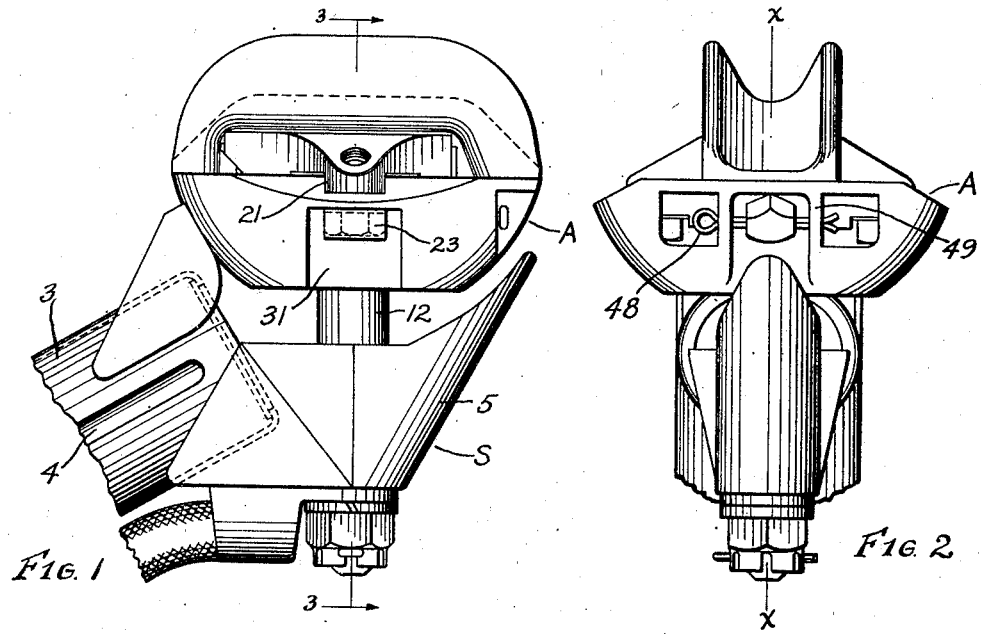
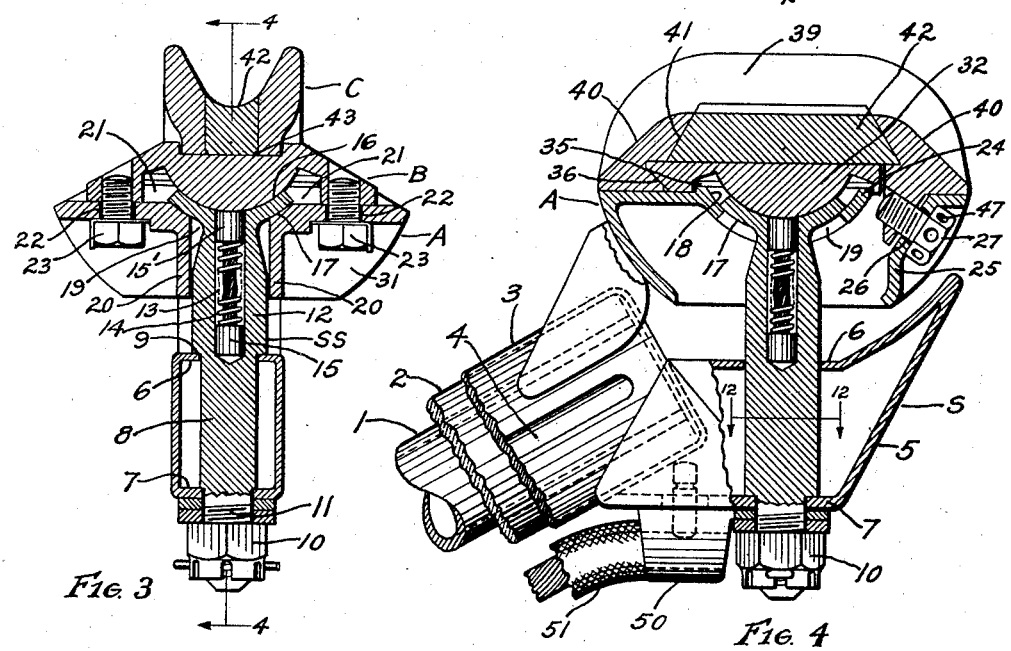
Inventor
ERNST A. LARSSON
By
Attorney June 23, 1936.  E. A. LARSSON  2,044,886

TROLLEY HEAD AND CURRENT COLLECTOR

Filed Feb. 9, 1934  2 Sheets-Sheet 2

Inventor
ERNST A. LARSSON
By
Attorney

Patented June 23, 1936

2,044,886

UNITED STATES PATENT OFFICE 2,044,886

TROLLEY HEAD AND CURRENT COLLECTOR

Ernst A. Larsson, Mansfield, Ohio, assignor to The Ohio Brass Company, Mansfield, Ohio, a corporation of New Jersey Application February 9, 1934, Serial No. 710,484

23 Claims. (Cl. 191—59.1)

My invention relates to overhead current collecting device and its particular use is in connection with electrically operated vehicles, particularly those known as trolley buses.

The current collecting device of the trolley bus should be light and the collecting member should rotate about a substantially vertical axis, also in a substantially vertical plane so as to permit the collecting device to contact with the trolley wire as the bus swings laterally as it moves down the thorofare.

One of the objects of my invention is to simplify and improve the construction of a similar device shown in U. S. Patent 1,893,383 granted to C. J. Way on January 3, 1933, whereby the shoes may be simpler in construction and more easily renewed.

Other objects will be apparent as I further disclose the construction and operation of my invention.

My invention resides in the new and novel construction, combination and relation of the parts herein described and shown in the drawings accompanying this specification.

In the drawings:—

Fig. 1 is a side elevation of my invention.

Fig. 2 is a front elevation thereof.

Fig. 3 is a section on the vertical axis 3—3 of Fig. 1.

Fig. 4 is a partial section taken on a longitudinal plane with respect to Fig. 1 and conforming to the vertical axis X—X of Fig. 2.

In the preferred embodiment of my invention I employ a support member 1 which may be the end of a trolley pole or a short length of tubing, or rod, for attachment to the end of a trolley pole and which is preferably made of steel.

The sleeve 2 is of insulating material, preferably deformable rubber mounted upon the end of the member 1 and secured thereto against accidental removal.

Mounted upon the sleeve 2 is a support member S formed up in parts of sheet steel and the parts welded together or made of a casting preferably malleable cast iron.

Figure 5:
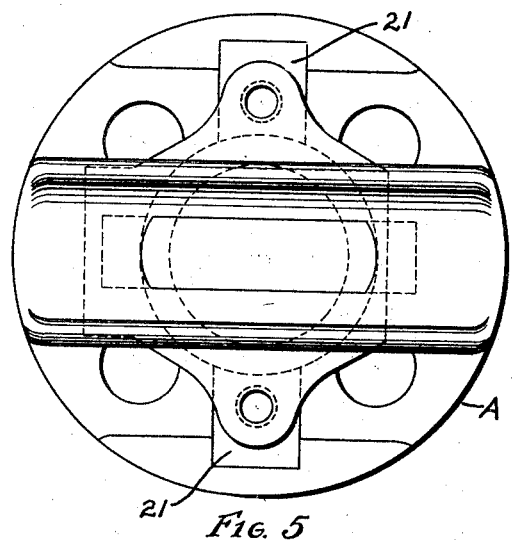
Fig. 5 is a top view of the lower saddle portion and shoe shown in Fig. 1.
Figure 6:
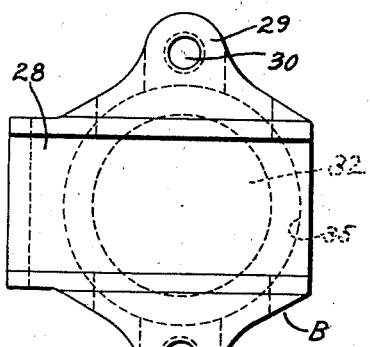
Figs. 6, 7 and 8 are top, end and side views respectively of the top saddle member.
Figure 7:
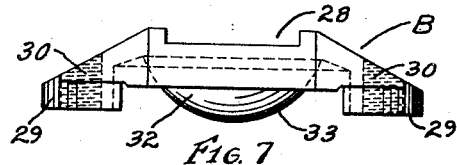
Figure 8:
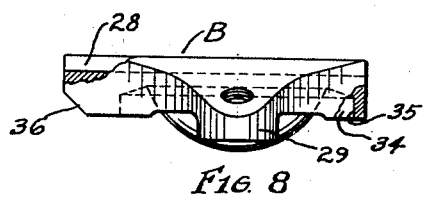
Figure 9:
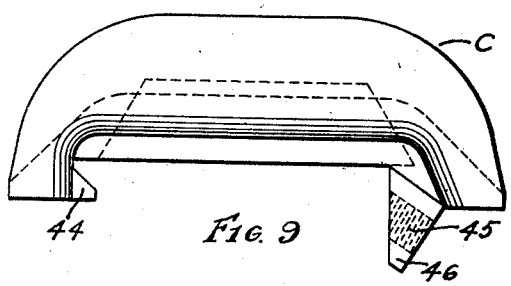
Figs. 9, 10 and 11 are side, top and end views respectively of the current collecting shoe.
Figure 11:
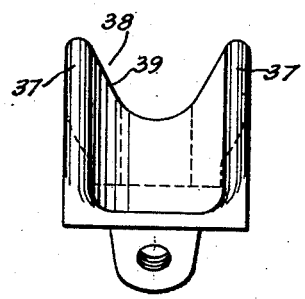
Figure 10:
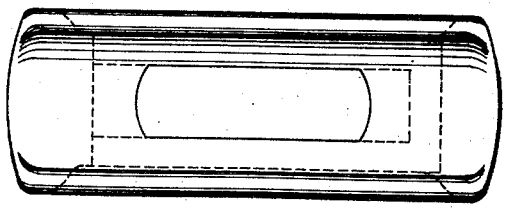
Figure 12:
Fig. 12 is a section on the line 12—12 of the support member shown in Fig. 4.

The support S is provided with an elongated tubular portion 3 arranged to be mounted upon the member 2 against accidental or unintentional removal and prevent it from rotating relative to the member 2 by the sidewall depression 4 which forms an interlock with the member 2. Projecting from the portion 3 of the support S is a portion 5 provided with a top wall 6 and bottom wall 7, and each having registered openings conforming to the shape shown in Fig. 12 to receive the support stud SS.

The shape of the portion 8 of the stud SS prevents it from rotating relative to the support S and it is held in fixed relation thereto by means of the shoulder 9 and the nut 10 on the threaded end 11.

The portion 12 of the support SS is circular in cross section and is provided with an axial orifice 13 in which is mounted a spring-expanded contactor 14 provided with end contacts 15 and 15' made preferably of copper.

At the upper end of the portion 12 of the support SS is a flange, the upper surface 16 of which is concave and the outer surface 17 is convex and parallel to the surface 16.

Mounted upon the support SS is a saddle comprising a lower saddle member A and an upper saddle member B. Both members are made of metal, preferably ferrous, although either may be made of a non-ferrous metal.

Mounted upon the top saddle member B is a current conducting shoe C.

The member A is made as light as possible and its walls as a rule are about ⅛″ thick. The upper surface of the member A has a cup-shaped depression formed with a concave spherical surface 18 conforming to the convex spherical surface 17 and opening into the spherical cavity from below is an elongated slot 19 through which the support SS extends. Projecting downwardly and extending along the slot 19 are spaced side walls 20 which will contact with the portion 12 of the support SS sufficiently to maintain the shoe and saddle in an upright position relative to the axis X—X. The upper surface of the member A is provided with a pair of aligned transverse slots 21 positioned on opposite sides of the spherical depression to receive parts of the member B. Openings 22 extend through the upper wall of the member A and open into the slots 21 to receive the bolts 23.

Projecting upwardly from the upper surface of the member A is an annular flange 24 (Fig. 4 intersected by the slots 21) (Fig. 3)), the center of which is on the axis X—X.

The elongated slot 19 permits the saddle parts

A and B and the shoe to pivot in a plane corresponding to the axis X—X, Fig. 2.

The member A is also provided with a wall 25 with an opening 26 therethrough to receive the bolt 27.

Mounted upon the saddle member A is the saddle member B which has an upper longitudinal groove 28 in which is positioned the shoe C. Projecting downwardly are two lugs 29, which are positioned in the transverse slots 21 of the member A and are threaded at 30 to receive the bolts 23 which hold the part B to the part A. The heads of the bolts 23 are easy of access through the side slot 31 in the member A.

The member B is provided on its under surface with a portion 32 having a convex spherical surface 33 corresponding to the concave surface 16 of the support SS.

The member B is provided on its under surface with an annular groove 34 surrounding the spherical boss 32 and the wall 35 is arranged to engage with the outer surface of the flange 24 on the member A thus centering the member B with respect to the member A and the axis X—X.

The contact 15' of the conductor 13 engages with the spherical surface 33 of the boss 32.

The member B is also provided with an undercut surface 36 which extends above the upper surface of the member A and producing therewith a transverse 'V-shape groove.

The collector shoe comprises a body of metal preferably copper, bronze or other non-ferrous metals, and provided with spaced flanges 37 forming a groove 38 therebetween with the longitudinal surface 39 arranged to engage the overhead conductor or trolley. The ends 40 of the contact surface 39 are sloped downwardly.

The body of the shoe is provided with an elongated recess 41 having side and end walls but no upper or lower walls. Mounted within the recess 41 is a metal insert 42 preferably of hardened steel and held in place by slightly peening the rim along the lower edge of the insert 42 as shown at 43 Fig. 3. If desired, the insert 42 may be welded in position. The tapering end walls of the body and insert prevent the displacement of the insert upwardly. The hard metal insert materially increases the life of the shoe C when the same is made of a soft bronze composition or of copper.

The shoe C is mounted in the longitudinally extending slot 28 of the saddle member B and is held in position by the hook portion 44 and the bolt 27 cooperating with the threaded opening 45 in the lug 46. The hook 44 enters the V-shape opening formed by the surface 36 on the member B and is securely locked in position when the bolt 27 is secured. To prevent the bolt 27 from becoming loose it is drilled with a number of holes 47 through which a cotter 48 may be placed and which cotter also extends through holes in the flanges 49 of the saddle member A.

The invention thus described permits the parts A and B to be made of a long-wearing metal, such as iron or steel and when properly secured to the support SS need not be removed or changed when it is necessary to replace a shoe in which case the bolt 27 is removed and the free end of the shoe tipped upwardly until the lug 46 clears the saddle B then another shoe may be placed in position by reversing the operations and replacing the bolt 27.

The shoe is found to be more economical to produce than where the spherical boss 32 is made a part of the shoe and also the manner of applying the insert 42 is less expensive than where the metal of the shoe is cast upon the insert.

Interposed between the nut 19 and the support S is a terminal lug 50 to which is secured the conducting cable 51.

Modifications will suggest themselves to those skilled in the art, therefore, I wish to be limited only by my claims.

I claim:—

1. A current collector head comprising a support, a sleeve of insulating material mounted on the support and secured thereto and extending back from one end, a second support having a receptacle-like part mounted on the insulating sleeve and secured thereto, a third support mounted on the second support and having a flange at the upper end forming a spherical shaped recess with a spherical concave upper surface and the lower surface of the flange being spherically convex, a saddle mounted on the flange to oscillate in a substantially vertical plane and to rotate about a substantially vertical axis extending through the spherical shaped recess, the saddle comprising an upper member and a lower member, the upper member provided with a boss having a spherical convex surface mounted in the said spherical recess and having co-acting bearing surfaces and the lower member provided with a spherical recess having a spherical concave surface co-acting with the spherical convex surface on the third support, means securing the saddle members together upon the third support and a collector shoe mounted upon the upper saddle member, the shoe provided with a hook portion arranged to engage with a hook portion on the upper saddle member and a securing device spaced from the hook portion and cooperating with the lower saddle member and with the shoe to detachably secure the shoe to the saddle.

2. A current collector head comprising a support adapted to be mounted on a trolley pole, a second support mounted on the first support and having a curved flange at one end forming a receptacle with a spherical inner surface and a spherical convex outer surface, the surfaces having a common center, a saddle mounted upon the flange and comprising a lower part with a recess having a spherical surface co-acting with the convex surface on the said flange to form bearing surfaces, the upper saddle member having a projecting part with a spherical convex surface and co-acting with the concave surface of the said flange to form bearing surfaces, means to hold the saddle members together and in place upon the said second support, the saddle arranged to oscillate in a substantially vertical plane and to rotate about a substantially vertical axis passing through the center of the said spherical surfaces, a collector shoe mounted on the saddle and having means adjacent one end to engage with means on the upper saddle member to hold one end of the shoe in relation to the saddle and means adjacent the other end of the shoe to coact with means associated with the lower saddle member to removably secure the shoe in position on the saddle.

3. A current collector head comprising a body having a part to secure the head to a support and an auxiliary support detachably secured to the body against relative rotation, the auxiliary support having a cup shaped receptacle, a saddle rotatively and pivotally mounted on the auxiliary support and having a part positioned within the receptacle and another part to cooperate with the auxiliary support, means to secure the parts together and to the auxiliary support and a shoe attached to one of said parts and arranged to be removed without disturbing the said parts and having an insert of dissimilar metal to contact with a trolley conductor.

4. A trolley device comprising a head having a part arranged to be secured to a support, an auxiliary support secured to the head and having a bearing surface formed upon its upper end, a saddle having an upper member and a lower member secured together upon the auxiliary support, the upper saddle member having a bearing surface cooperating with the aforesaid bearing surface permitting the saddle to oscillate in a vertical plane and rotate in a horizontal plane and a shoe removably secured to the upper saddle member and having means at opposite ends of the shoe to engage with means on the upper and lower saddle member to hold the shoe to the saddle.

5. A current collector comprising a support having a receptacle with a concave spherical bearing surface, a saddle comprising an upper and a lower member secured together, the upper member having a part with a convex spherical bearing surface mounted within the receptacle to support the saddle, the surfaces contacting and permitting the saddle to pivot and to rotate relative to the support about a common center, a separately formed contact shoe of metal having a groove with an elongated contact surface removably attached to the saddle without dismounting the saddle from the support and a wear member removably carried by said shoe.

6. A current collector comprising a support having a receptacle with a concave spherical bearing surface, a saddle comprising an upper and a lower member secured together and to the support, the upper member having a part with a convex spherical bearing surface mounted within the receptacle to support the saddle, the surfaces contacting and permitting the saddle to pivot and to rotate relative to the support about a common center and a contact shoe of metal having a groove with an elongated contact surface removably attached to the saddle, the shoe having an elongated recess therein opening into the groove and an insert of dissimilar metal to that of the shoe mounted within the recess and forming part of the elongated contact surface.

7. A current collector comprising a main support with means to mount the support on a pole, an auxiliary support projecting from the main support and having a cup-shaped receptacle with a spherical concave bearing surface at its free end, a saddle having a spherical convex bearing surface mounted within the cup-shaped receptacle, the bearing surfaces permitting the saddle to rotate relative to the auxiliary support, a member depending from the saddle and enclosing the upper portion of the auxiliary support, means to detachably secure the saddle and depending member together and to the auxiliary support, a separately formed contact shoe mounted on the saddle member to rotate therewith, means to detachably secure the shoe to the saddle, and a removable bearing member mounted on the shoe.

8. A saddle for a current collector comprising a lower and an upper member, the lower member having a substantially horizontal surface with a depending skirt, a transverse groove along the said horizontal surface, a cup-shaped recess in the said surface having a spherical concave bearing surface, a portion of the skirt depressed and an opening therethrough, and a slot formed in the bottom of the cup-shaped recess to receive a support, the upper member having lugs to fit in said groove and a groove in the upper surface of the upper member running in the same direction as aforesaid slot, registering openings in the said lugs and the lower member and means positioned in the openings and cooperating with the members to hold them together, the end of the upper member forming with the upper surface of the lower member, a transverse groove to receive a transverse lug on a current collector shoe when positioned in the groove in the upper member, a projecting boss on the upper member having a convex spherical bearing surface to rest in a cup-shaped receptacle on the support, the bearing surfaces having a common center.

9. A current collector device comprising an upper and a lower member detachably secured together and having spherical bearing surfaces, a support having spherical bearing surfaces contacting the first said bearing surfaces to support the said members in movable relation to the said support, the upper member having a longitudinal groove and a transverse groove thereto, a current collector shoe positioned in the longitudinal groove and having an inwardly projecting transverse lug at one end to engage with the said transverse groove to hold one end of the shoe in place, a lug at the other end of the shoe and means to removably secure the other end of the shoe to the lower member.

10. In a current collecting device in combination, a swivel having a convex spherical bearing surface arranged to engage a support having a concave spherical bearing surface, the bearing surfaces having the same center and radius of curvature and a collector shoe detachably mounted on the swivel, the shoe having an elongated contact surface of a different metal from the body of the shoe, means at one end of the shoe to interlock with means on the swivel and means to detachably secure the other end of the shoe to the swivel.

11. In a current collecting device in combination, a shoe comprising a body having a groove with an elongated contact surface to engage a trolley wire, an elongated slot through the body and opening into the groove, a steel insert positioned in the slot and having one surface forming a part of the contact surface, the opposite face of the insert exposed and means to hold the insert in position and a swivel for carrying the shoe, the shoe and swivel detachably secured together by means at each end of the shoe cooperating with means on the swivel, the swivel provided with a spherical bearing surface to engage with a spherical bearing surface on a support.

12. A current collector shoe comprising an elongated body of non-ferrous metal provided with a groove having an elongated contact surface to engage a trolley wire, the side of the body opposite the contact surface being substantially flat, an elongated recess in the body opening onto the said surfaces, an insert of ferrous metal positioned in the recess and having one exposed surface forming a part of the said contact surface, means cooperating with other surfaces of the insert to maintain it in position and means to secure the shoe to a support.

13. A current collector shoe comprising an elongated body of non-ferrous metal provided with a groove having an elongated contact surface to engage a trolley wire, the side of the body opposite the contact surface being substantially flat, an elongated recess in the body opening onto the said surfaces, an insert of ferrous metal positioned in the recess and having one exposed surface forming a part of the said contact surface, means cooperating with other surfaces of the insert to maintain it in position, hook means at one end of the shoe and threaded means at the other end to receive a bolt whereby the shoe may be detachably secured to a support.

14. A current collector shoe comprising an elongated body of non-ferrous metal provided with a groove having an elongated contact surface to engage a trolley wire, an elongated recess in the body opening onto the said surface, an insert of ferrous metal positioned in the recess and having an exposed surface forming a part of the contact surface, means to hold the insert in the recess, a transverse hook at one end of the shoe to engage with means on a support and a threaded boss on the other end of the shoe to receive a stud to detachably hold the shoe in position on the support.

15. A current collector shoe comprising an elongated body of non-ferrous metal provided with a groove having an elongated contact surface to engage a trolley wire, an elongated recess in the body opening onto the said surface, an insert of ferrous metal positioned in the recess and having an exposed surface forming a part of the contact surface, means to hold the insert in the recess, a transverse hook at one end of the shoe to engage with means on a support and a threaded boss with an obliquely disposed axis on the other end of the shoe to receive a stud to detachably hold the shoe in position on the support.

16. A slider shoe for use in collecting current from a conductor comprising in combination a main body member of relatively soft metal and provided with a pair of upstanding lips and having a longitudinally extending slot of limited extent open at the lower side of said body member and extending up into the wear portion of said shoe, said slot being closed on all lateral sides and two opposite side walls of said slot being inclined toward each other upwardly, and a filler of relatively hard metal secured in said slot to provide a wear resisting surface for engagement with the conductor and adapted to be deposited therein from the open lower side thereof.

17. The method of manufacturing a slider shoe for collecting current from a conductor which comprises forming a slider shoe from relatively soft metal with a longitudinally extending slot open on the underside thereof and extending up into the wear portion of the shoe, and depositing in said slot from the open lower side thereof a filler of relatively hard metal to form a wear resisting portion.

18. The method of manufacturing a slider shoe for collecting current from a conductor which comprises forming a slider shoe from a relatively soft metal, providing a slot open on the underside of said shoe and extending up into the wear portion thereof, and inserting a relatively hard metal in the slot through the open underside thereof to form a wearing portion.

19. The combination with a trolley head, of a shoe detachably secured to said trolley head and having a recess opening through the surface of said shoe adjacent said head, and a wear member insertable in said recess through the opening in said surface and projecting up into the wear portion of said shoe.

20. The combination with a trolley head, of a shoe mounted on said head for engaging a trolley wire, said shoe having a recess therein opening through the surface thereof adjacent said head to permit the insertion of a wear member in said recess through the opening in said surface, and means for securing said shoe to said head after the insertion of said wear member.

21. A trolley head comprising a support having a bearing at its upper end, a saddle comprising upper and lower members engaging said bearing, and a shoe detachably mounted on the upper member of said saddle, said shoe having a recess therein opening through the surface adjacent said saddle to receive a bearing member through the opening in said surface, and means for detachably securing said shoe to said upper saddle member after said wear member is in position.

22. A current collecting shoe comprising an elongated body of metal with a trolley wire receiving groove having a recess therein opening through the surface of said groove and through the opposite surface of the body, a filler positioned in said recess and insertable therein through the opening in said opposite surface and having one surface flush with the adjacent surface of the body to form an even surface of contact with the wire and means projecting from the edge of the body adjacent said recess and overlapping the face of the filler opposite the contact surface thereof to hold the filler in position.

23. A current collecting shoe comprising an elongated body of metal with a trolley wire receiving groove having a recess therein opening through the surface of said groove and through the opposite surface of the body, a filler positioned in said recess and insertable therein through the opening in said opposite surface and having one surface flush with the adjacent surface of the body to form an even surface of contact with the wire and means projecting from the edge of the body adjacent said recess, overlapping the face of the filler opposite the contact surface thereof to hold the filler in position, hook means at one end of the body and threaded means at the other end to receive means whereby the shoe may be detachably secured to a support.

ERNST A. LARSSON.